United States Patent
Momose

(10) Patent No.: US 6,822,753 B1
(45) Date of Patent: Nov. 23, 2004

(54) COMPUTER READABLE MEDIUM FOR SETUP AND SETUP METHOD

(75) Inventor: Hiroaki Momose, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 981 days.

(21) Appl. No.: 09/680,476

(22) Filed: Oct. 6, 2000

(30) Foreign Application Priority Data

Oct. 6, 1999 (JP) .............................................. 11-286061

(51) Int. Cl.$^7$ ......................... G06F 3/00; G06F 15/177; G06F 9/445
(52) U.S. Cl. ......................... 358/1.13; 358/1.15; 713/1; 713/2
(58) Field of Search ................. 358/1.1–1.9, 1.11–1.18; 719/321, 322, 323, 324, 325, 326, 327, 328, 318; 710/18, 15, 16, 17; 713/1, 2; 717/168

(56) References Cited

U.S. PATENT DOCUMENTS

| | | | |
|---|---|---|---|
| 5,325,532 A | * | 6/1994 | Crosswy et al. ................ 713/2 |
| 6,083,007 A | * | 7/2000 | Joliat et al. ................... 434/262 |
| 6,366,966 B1 | * | 4/2002 | Laney et al. ................... 710/18 |
| 6,529,992 B1 | * | 3/2003 | Thomas et al. ................ 711/1 |

* cited by examiner

*Primary Examiner*—King Y. Poon
(74) *Attorney, Agent, or Firm*—Sughrue Mion, PLLC

(57) ABSTRACT

On a setup computer-readable medium, there are recorded a USB port driver file, an INF file including information about a folder in which the USB port driver file is recorded, a printer driver file, and a setup program. After having installed a printer driver on the assumption that a printer is connected to a parallel port (step S102), the setup program copies the INF file to a folder ¥WINDOWS¥INF and a USB port driver file to a folder specified by designation information stored in the INF file (step S103). The setup program performs a connection monitoring operation (step S104) for switching a connection port to which the printer is to be connected when a printer is detected to have been connected to the USB port.

8 Claims, 12 Drawing Sheets

COMPUTER READABLE MEDIUM FOR SETUP AND SETUP METHOD

BACKGROUND OF THE INVENTION

1. Field of the Invention

The present invention relates to a computer readable medium for setup purpose (hereinafter called simply "setup computer-readable medium") and a setup method, both of which make a printer be adaptable for use with a computer preinstalled with WINDOWS 98 or the like.

The present application is based on Japanese Patent Application No. Hei. 11-286061, which is incorporated herein by reference.

2. Description of the Related Art

WINDOWS 95/98 (registered trademarks which are owned by Microsoft corporation in the U.S. and registered in U.S. and other countries) are equipped with a function called Plug&Play (usually abbreviated as "PnP"). By means of this function, a PnP-compatible device added to a computer system is automatically identified, and software (or a driver) required for activating the device is automatically installed on a computer.

More specifically, when a PnP-compatible device is additionally connected to a computer, WINDOWS retrieves an INF file pertaining to the device from a folder named ¥WINDOWS¥INF. Here, an INF file (also called a "setup information file") is a file in which there is defined information required for setting up a driver; for example, information about the name and location of a driver to be installed in WINDOWS for activating the device and information about a folder into which a driver is to be installed. An INF file is retrieved on the basis of a vender ID or a device ID assigned to and acquired from an additionally-connected device.

In a case where an INF file pertaining to the additional device can be successfully retrieved, a folder having a driver stored therein and the name of the folder are identified on the basis of the information described in the INF file. On the basis of the result of identification, a driver for activating the device is automatically installed (without involvement of operations to be performed by the user).

In a case where an additionally-connected device is brand new and where an INF file pertaining to the device is not stored in the folder ¥WINDOWS¥INF, an "Add New Hardware Wizard" is executed.

For example, in a case where a printer having a universal serial bus (USB) interface is connected to a computer as a first printer through use of a USB cable, a dialogue box which is shown in FIG. 15 and indicates a necessity for using a driver for a USB printer (i.e., a USB port driver) appears on a display of the computer. When the user clicks the "NEXT" button in the dialogue box, a dialogue box for selecting a retrieval method shown in FIG. 16 appears on the screen. When the user clicks the "NEXT" button in the dialogue box, a dialogue box for specifying a location from which a driver is to be retrieved (i.e., a location where an INF file of a driver is stored), such as that shown in FIG. 17, is displayed. The dialogue box shown in FIG. 17 appears as a result of a certain folder within a network drive being specified as a retrieval location in response to a dialogue box which has been displayed as a result of the user clicking the "NEXT" button in the dialogue box shown in FIG. 16. In a case where an INF file of a USB port driver is stored on a floppy disk or CD-ROM, a floppy disk driver or a CD-ROM driver is specified as a retrieval location through the dialogue box.

When the user clicks the "NEXT" button after having specified a retrieval location, an INF file pertaining to a USB port driver is retrieved from the thus-specified retrieval location. In a case where the INF file has been retrieved successfully, there is displayed a dialogue box indicating that preparation for installing the driver has been completed, such as that shown in FIG. 18. When the user clicks the "NEXT" button in the dialogue box, actual installation of a driver is commenced. Upon completion of installation of the driver, there is displayed a dialogue box showing completion of driver installation, such as that shown in FIG. 19.

By means of clicking the "FINISHED" button in the dialogue box, the user terminates the wizard, whereupon a wizard for installing a driver of the printer connected to the computer by way of the USB cable is started.

First, a dialogue box as shown in FIG. 20 is displayed. When the user clicks the "NEXT" button in the dialogue box, a dialogue box for selecting a retrieval method (see FIG. 16) is displayed. When the user clicks the "NEXT" button in the dialogue box, a dialogue box for specifying a retrieval location (see FIG. 17) is displayed. When the user clicks the "NEXT" button after having specified a retrieval location, an INF file pertaining to a driver for the printer "EPSON Stylus Photo 800" connected to the computer is retrieved from the thus-specified retrieval location. A dialogue box indicating that preparation for installing a driver has been completed, such as that shown in FIG. 21, is displayed.

When the user clicks the "NEXT" button in the dialogue box, the "ADD PRINTER WIZARD" is commenced. As a result, there is displayed a dialogue box for assigning a name to the printer, such as that shown in FIG. 22. When the user clicks the "NEXT" button in the dialogue box, actual installation of a printer driver is commenced. After completion of installation of the printer driver, a program named "Vendor Setup" is initiated for creating a folder and an icon of Readme.txt. After completion of creation of a folder and an icon, there is displayed a dialogue box indicating completion of installation of the printer driver, such as that shown in FIG. 23. When the user clicks the "FINISHED" button in the dialogue box, there is displayed a dialogue box shown in FIG. 24. When the user clicks the "FINISHED" button in the dialogue box, printer setup is completed.

In a computer preinstalled with WINDOWS 95/98, a USB printer becomes available when the user performs the foregoing setup operations. Although the previously-described wizards require cumbersome operations (i.e., the user must click many buttons), the wizards enable a person who understands the messages appearing in the respective dialogue boxes to set up a printer without fail. However, the wizards may cause the person who uses only a browser and does not have any knowledge about computers to perform a faulty operation. In a case where a faulty operation is performed, as a natural result a USB printer fails to become available. In some cases, a faulty operation brings a computer into a state in which wizards are not executed even when the computer is restarted.

SUMMARY OF THE INVENTION

The present invention is aimed at providing a setup computer-readable medium for setup purpose and a setup method which enable virtually anybody to set up a sprinter very simply without fail.

To this end, the present invention provides a setup computer-readable medium for making a printer be adaptable for use with a computer which utilizes an operating system and has an interface of first type and a parallel interface, the operating system retrieving a setup information file pertaining to an added device from a specific location and installing a driver pertaining to the device in accordance with the retrieved setup information file. More specifically, the setup computer-readable medium stores a port driver file of first type which is a port driver file of first type for causing the interface of first type to act as a port of first type for use with the printer, a setup information file for the port driver of first type including location designation information about a location in which the port driver file of first type is recorded, a printer driver file for the printer, and a setup program for causing the computer to perform processing pertaining to a printer driver installation step of installing a printer driver for the printer in accordance with the printer driver file, on the assumption that the printer is connected to a parallel port, and processing pertaining to a copy step of copying the setup information file to the specific location and copying the port driver file of first type to a location designated by the location designation information stored in the setup information file.

When a setup program recorded on the setup computer-readable medium according to the present invention is executed, a setup information file for the port driver of first type is copied to a specific location (a folder ¥WINDOWS¥INF in a case where an operating system is WINDOWS) from which an operating system (for example, WINDOWS) first retrieves a setup information file. The port driver file of first type is copied to a location which is designated in the setup information file as a location for recording a driver file.

So long as the printer is connected to the computer after the setup program has been executed, the operating system automatically installs the port driver of first type (without displaying a dialogue box or the like for specifying a retrieval location). More specifically, so long as the setup computer-readable medium is used, a printer can be practically set up without involvement of occurrence of misoperation.

Preferably, the setup computer-readable medium is embodied by means of adopting a setup program which causes the computer to perform processing pertaining to a connection monitoring step. In the connection monitoring step, an operating system forms a port of first type for the printer by reference to the setup information file copied to the specific location; there is monitored whether the printer is connected to the port of first type or the parallel port; when the printer is connected to the port of first type, a connection port to which the printer is to be connected is changed to the port of first type, and processing is terminated; and, when the printer is connected to the parallel port, processing is terminated without changing a connection port to which the printer is to be connected.

If the setup computer-readable medium is embodied by means of adopting such a setup program, a connection port to which the printer is to be connected may be set without a necessity for manual operations.

Preferably, the setup computer-readable medium is embodied by means of adopting the connection monitoring step, in which there is displayed a first dialogue box which instructs the user to connect the printer to the computer and turn on the power of the printer and which does not have any item operable by the user; and, when a predetermined period of time has lapsed with the printer being connected to neither the parallel port nor the port of first type, there is displayed a second dialogue box having an item operable by the user, and processing is terminated when the item on the second dialogue box is operated.

It is desired that a program can be aborted (canceled) when erroneously executed. Since a common setup program performs setup operations by means of the user clicking a button in a dialogue box, if a dialogue box having an item such as a "CANCEL" button is displayed from the beginning, conceivably the user may click a button in the dialogue box without understanding instructions provided in the dialogue box. For this reason, as mentioned above, the first and second instruction dialogue boxes are displayed sequentially, to thereby inform the user of operations to be performed without fail and in such a manner that the user can cancel operations.

Preferably, the setup computer-readable medium is embodied by means of further storing an uninstall program for causing the computer to uninstall the printer driver installed in the printer driver installation step, as well as the port driver file of first type and the setup information file which have been copied in the copy step.

Preferably, the interface of first type belonging to the computer with which the setup computer-readable medium according to the present invention is used involves a necessity for installing a port driver. Any type of interface may be used as the interface of first type, so long as a printer can be connected to the interface. For example, the interface of first type may be embodied as a USB interface or an IEEE 1394 interface.

The present invention also provides a setup method for making a printer be adaptable for use with a computer which utilizes an operating system and has an interface of first type and a parallel interface, the operating system retrieving a setup information file pertaining to an added device from a specific location and installing a driver pertaining to the device in accordance with the retrieved setup information file. More specifically, the setup method comprises a printer driver installation step of installing a printer driver for the printer, on the assumption that the printer is connected to a parallel port, a copy step of copying a setup information file to a specific location, the setup information file being a port driver file of first type for causing the interface of first type to act as a port of first type for use with the printer and including location designation information about a location in which the port driver file of first type is recorded, as well as copying the port driver file of first type to a location designated by the location designation information stored in the setup information file, and a connection step for connecting the printer to the computer after processing pertaining to the printer driver installation step and processing pertaining to the copy step have been completed.

According to the setup method, installation of the driver of first type is completed without displaying a dialogue box or the like for specifying a retrieval location. Accordingly, so long as the setup method is used, a printer can be actually set up without occurrence of misoperation.

DETAILED DESCRIPTION OF THE PREFERRED EMBODIMENTS

Preferred embodiments of the present invention will now be described in detail with reference to the accompanying drawings.

The outline of a setup computer-readable medium for setup purposes according to an embodiment of the present invention will be described by reference to FIGS. 1 and 2.

Figure 1:
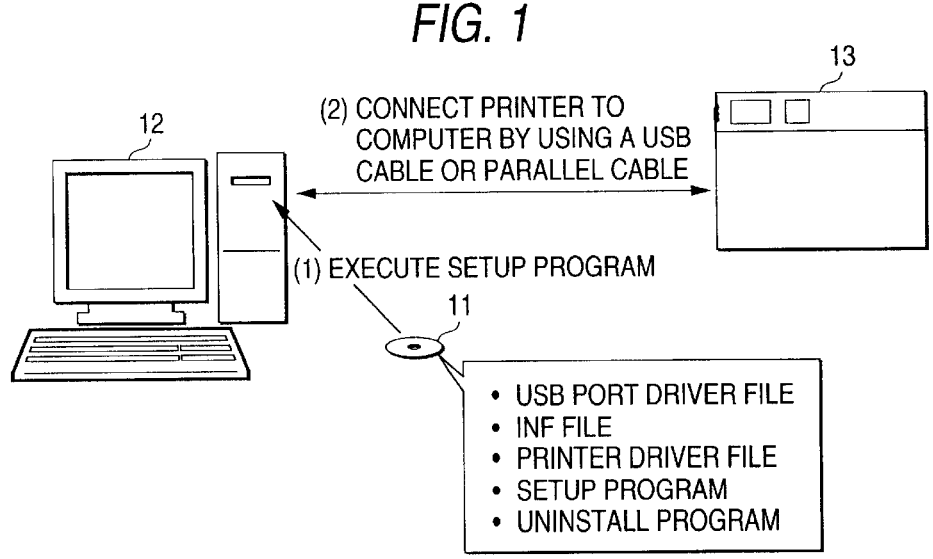
FIG. 1 is an explanatory view showing a setup computer-readable medium according to an embodiment of the present invention.

As schematically shown in FIG. 1, a setup computer-readable medium 11 for setup purposes according to this embodiment is used for making a printer 13 be adaptable for use with a computer 12.

Figure 2:
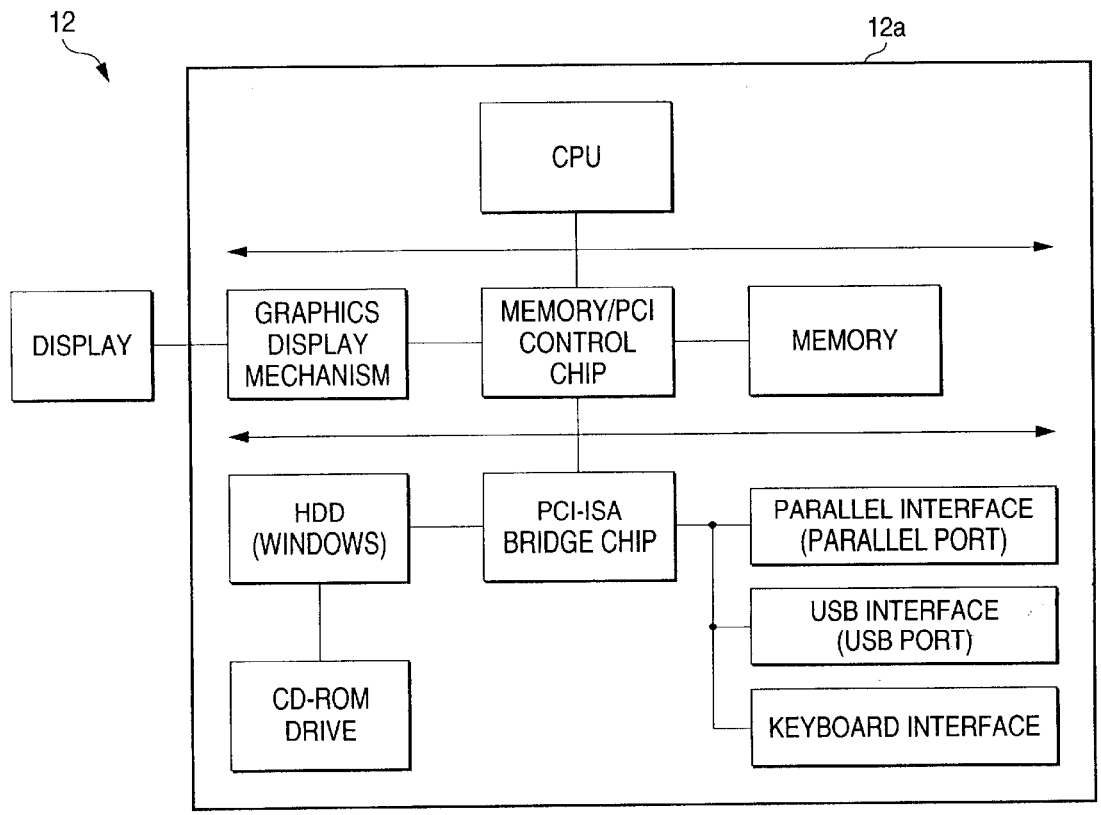
FIG. 2 is a block diagram showing the configuration of a computer with which the setup computer-readable medium according to the embodiment is used.

As shown in FIG. 2, the computer 12 which is an object of use for the setup computer-readable medium 11 is a computer of popular configuration and comprises a main unit 12a; a display connected to a graphics display mechanism; an unillustrated keyboard; and a mouse. Specifically, the main unit 12a further comprises a CPU; a memory/PCI control chip; memory; a graphics display mechanism; a PCI-ISA bridge chip; an HDD; a CD-ROM drive; a parallel interface (parallel port); a USB interface (USB port); and a keyboard interface. The computer 12 is pre-installed with an operating system (i.e., WINDOWS 98 in this embodiment) having a Plug&Play function.

The printer 13 has a USB interface and a parallel interface. In other words, the printer 13 can be connected to the computer 12 by way of either a USB cable or a parallel cable.

As schematically shown in FIG. 1, the setup computer-readable medium 11 is embodied as CD-ROM having various types of files recorded thereon. More specifically, on the setup computer-readable medium 11 are recorded a USB port driver file to be loaded into the computer 12 (or to be installed in WINDOWS) for preparing a USB port for the printer 13 (hereinafter referred to as an "EPUSB port"), an INF file pertaining to the USB port driver file, and a printer driver file to be loaded into the computer 12 for activating the printer 13 by way of an EPUSB port or an LPT port. Further, the setup computer-readable medium 11 has recorded thereon a setup program to be executed for making the printer 13 be adaptable for use with the computer 12 (setting up the printer 13) and an uninstall program for uninstalling the installed files.

When the printer is set up through use of the setup computer-readable medium 11, the user sets the setup computer-readable medium 11 into the CD-ROM drive of the computer 12 before connecting the computer 12 to the printer 13 through use of either a USB cable or a parallel cable. The computer 12 executes a setup program recorded on the setup computer-readable medium 11 (see the circle "1" in FIG. 1). Subsequently, the user connects the printer 13 to the computer 12 through use of either a USB cable or a parallel cable, in accordance with instructions from dialogue boxes appearing on the display of the computer 12 (see the circle "2" in FIG. 1).

The configuration of the setup computer-readable medium 11 according to this embodiment will now be described in more detail, primarily in connection with details of the setup program.

Figure 3:
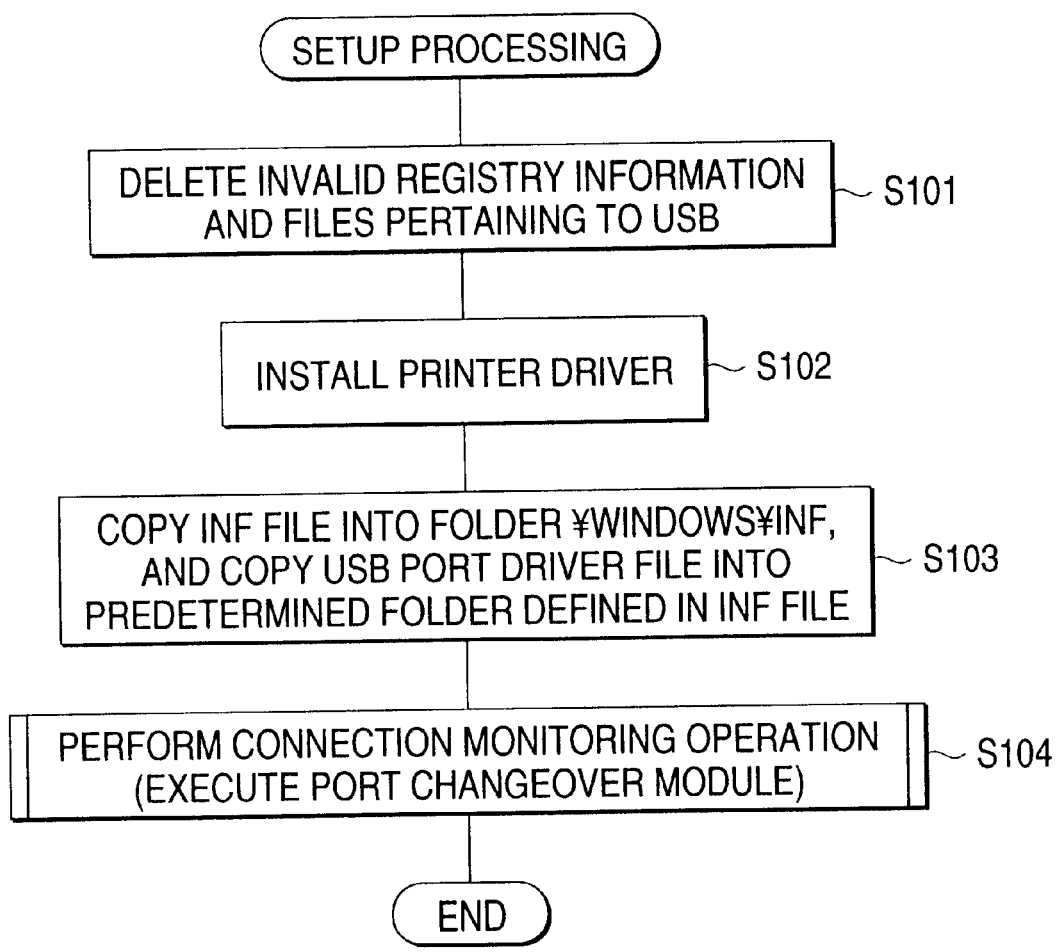
FIG. 3 is a flowchart showing a setup operation which is performed in accordance with a setup program recorded on the setup computer-readable medium according to the embodiment.
Figure 4:
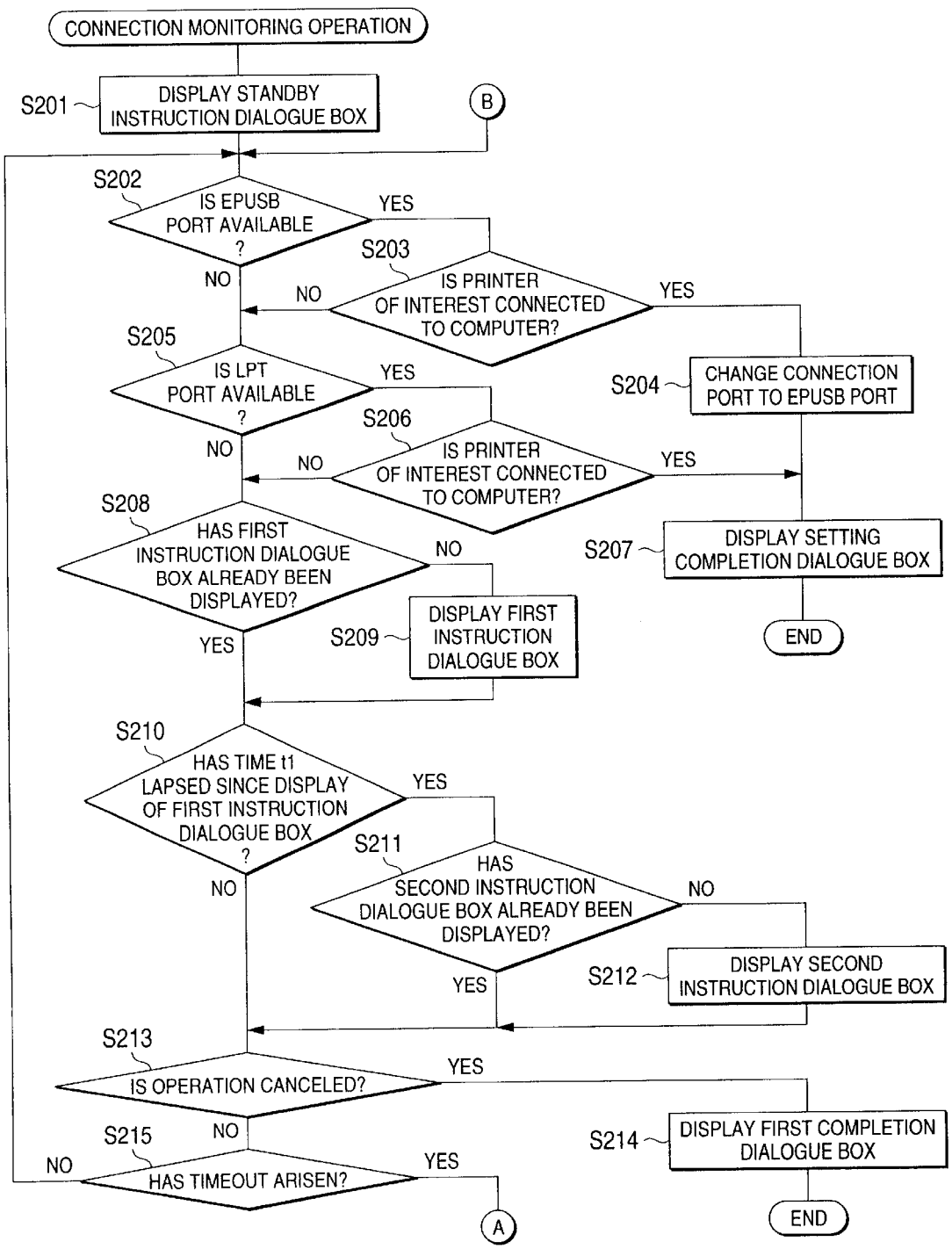
FIG. 4 is a flowchart of a connection monitoring operation to be performed at the time of a setup operation.
Figure 5:
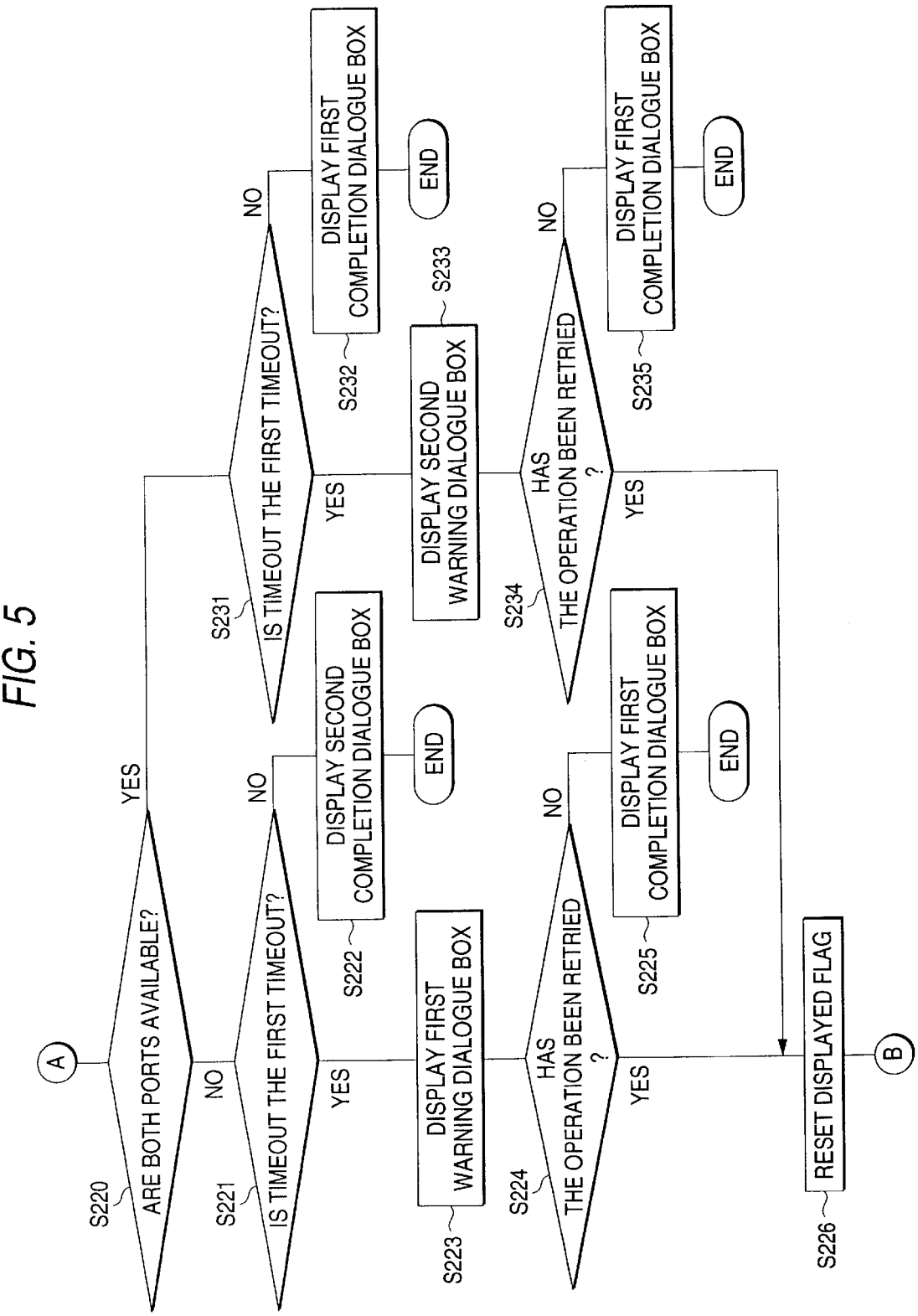
FIG. 5 is a flowchart of the connection monitoring operation to be performed at the time of a setup operation.

As a result of execution of the setup program, the computer 12 performs processing pertaining to the following procedures shown in FIGS. 3 through 5, along with processing pertaining to WINDOWS.

First, invalid registry information and files, both pertaining to a USB, are deleted (step S101 in FIG. 3). In order to cause WINDOWS to recognize that the computer 12 is connected to the printer 13 through use of a USB cable (i.e., in order to activate the Plug&Play function of WINDOWS), there is deleted invalid registry information or the like pertaining to a USB, which would be registered in a registry as a result of a faulty operation.

Subsequently, a printer driver for the printer 13 is installed from a printer driver file recorded on the setup computer-readable medium 11 into the computer 12 while a connection port to which the printer 13 is to be connected is taken as "LPT1" (i.e., a LPT port) (step S102). An INF file pertaining to an EPUSB port driver recorded on the setup computer-readable medium 11 is copied to a folder ¥WINDOWS¥INF. A USB port driver file which is described in the INF file as a file to be loaded is copied to a predetermined folder (a folder ¥WINDOWS¥EPUSBDRV in this embodiment) which is defined as a recording position in the INF file (step S103).

A port changeover module is activated, to thereby monitor whether the printer 13 is connected to the computer 12 by way of a USB cable or by way of a parallel cable. When the printer 13 is connected to the computer 12 through use of a USB cable, there is performed a connection monitoring operation for switching, to an EPUSB port, a connection port to which the printer 13 is to be connected.

Figure 6:
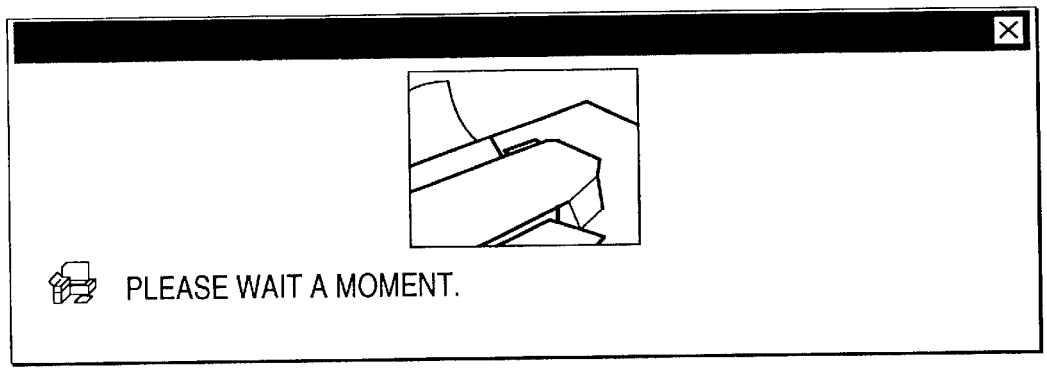
FIG. 6 is an illustration for describing a standby instruction dialogue box displayed at the time of the connection monitoring operation.

More specifically, at the time of a connection monitoring operation, procedures shown in FIGS. 4 and 5 are performed. First, a standby instruction dialogue box appears on the display of the computer 12 (step S201 in FIG. 4). As shown in FIG. 6, the standby instruction dialogue box displayed in step S201 is for instructing the user to stand by without doing anything (i.e., for informing the user of a port changeover module being active). In step S201, a displayed flag for a first instruction dialogue box and a displayed flag for a second instruction dialogue box are turned off. The first and second instruction dialogue boxes and their displayed flags will be described later in detail.

After indication of the wait instruction dialogue box, a determination is made as to whether or not an EPUSB port is available (i.e., whether or not an EPUSB port driver has already been installed) (step S202). The EPUSB port is prepared (or added) by WINDOWS, which has detected additional connection of a USB device (which will be described later in detail). In step S202, a determination is made as to whether or not an EPUSB port is available (i.e., whether or not an EPUSB port has already been prepared), on the basis of registry information.

In a case where it is determined that no EPUSB port is available (NO is selected in step S202), a determination is made as to whether or not an LPT port is available (step S205). In a computer having a parallel interface, an LPT port is prepared when the computer activates WINDOWS for the first time. For this reason, in principle YES is selected in step S205 (with the exception of a case where special settings are made).

In a case where an LPT port is available (YES is selected in step S205), a determination is made as to whether or not a printer of a type to be controlled by the printer driver (installed in step S102) is connected to the LPT port (step S206). In step S206, a determination is made by means of acquiring from the device connected to the LPT port a vendor ID, a device ID, or a like ID.

In a case where a printer of interest is not connected to the LPT port (NO is selected in step S206); more specifically, in a case where a device other than a printer of interest is connected to the LPT port or in a case where no device is connected to the LPT port, processing pertaining to step S208 is performed. In a case where no LPT port is available (NO is selected in step S205), processing pertaining to step S208 is performed.

In step S208, on the basis of the displayed flag for the first instruction dialogue box, a determination is made as to whether or not the first instruction dialogue box has already appeared on the display. In a case where the first instruction dialogue box has not yet been displayed (NO is selected in step S208), the first instruction dialogue box is displayed on the display. Further, there is performed a first instruction dialogue box display operation for setting a displayed flag pertaining to the first instruction dialogue box (step S209).

Figure 7:
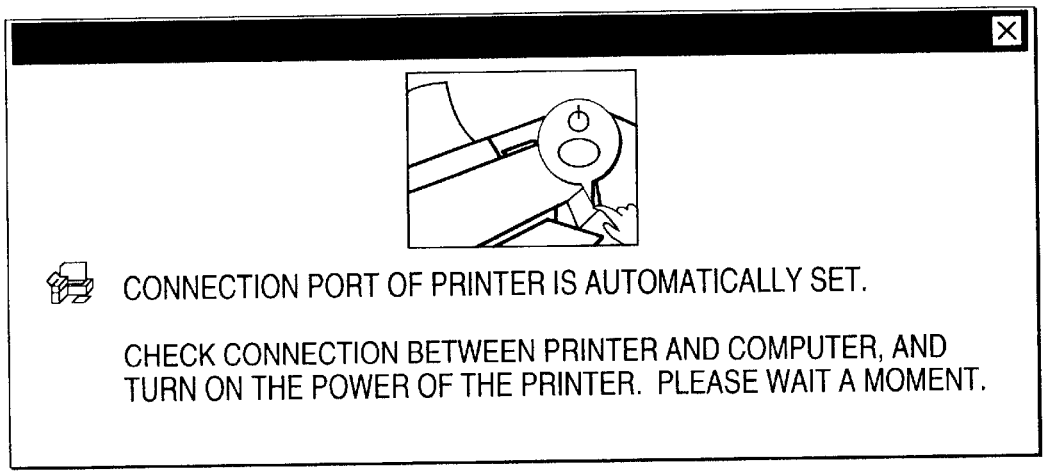
FIG. 7 is an illustration for describing a first instruction dialogue box displayed at the time of the connection monitoring operation.

FIG. 7 shows the layout of the first instruction dialogue box displayed in step S209. As illustrated, the first instruction dialogue box is for instructing the user to connect the printer 13 to the computer 12 and to turn on the power of the printer 13. The first instruction dialogue box does not have any button which the user can operate.

After completion of the first instruction dialogue box display operation (step S209), processing pertaining to step S210 is performed. In a case where the first instruction dialogue box has already been displayed (YES is selected in step S208), processing pertaining to step S210 is performed without involvement processing pertaining to step S209.

In step S210, a determination is made as to whether or not time t1 (t1 is equal to about ten seconds) has already lapsed since display of the first instruction dialogue box. In a case where time t1 has not lapsed since display of the first instruction dialogue box (NO is selected in step S210), a determination is made as to whether or not the user has issued a cancel instruction (step S213). A cancel instruction is issued by the user by means of clicking the "CANCEL" button in a second dialogue box to be described later. Accordingly, NO is always selected in step S213, whose processing is to be performed before indication of the second instruction dialogue box.

In a case where no cancel instruction has been issued (NO is selected in step S213), a determination is made as to whether or not a timeout has occurred (step S215). In step S215, in a case where a predetermined period of time (about three to four minutes) has lapsed since processing pertaining to step S201 has been performed or in a case where a predetermined period of time has lapsed since issue of a "RETRY" instruction in step S224 or S234, which will be described later, a timeout is determined to have arisen.

In a case where a timeout is determined to have not arisen (NO is selected in step S215), processing pertaining to step S202 and subsequent steps is performed again.

Figure 8:
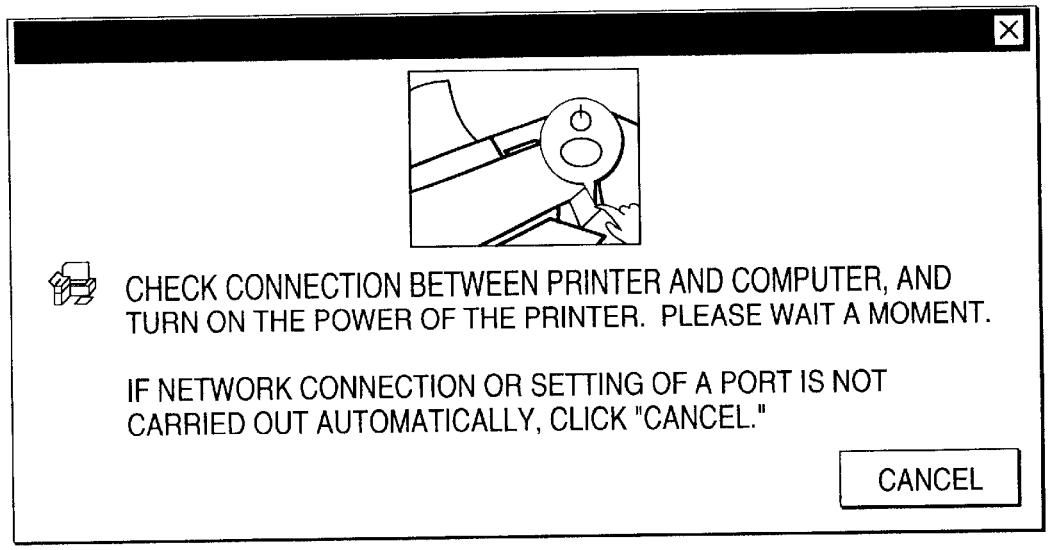
FIG. 8 is an illustration for describing a second instruction dialogue box displayed at the time of the connection monitoring operation.

In a case where time t1 has lapsed since display of the first instruction dialogue box during iteration of the foregoing processing operations (YES is selected in step S210), a determination is made as to whether or not the second instruction dialogue box has already been displayed, by reference to the value of a displayed flag for a second instruction dialogue box (step S211). In a case where the second instruction dialogue box has not yet been displayed (NO is selected in step S211), a second instruction dialogue box display operation is performed (step S212). At the time of a second instruction dialogue box display operation, a displayed flag pertaining to a second instruction dialogue box is set, wherewith the second instruction dialogue box shown in FIG. 8 appears on the display. More specifically, the second instruction dialogue box has a "CANCEL" button and instructs the user to connect the printer 13 to the computer 12 and to turn on the power of the printer 13.

Further, in a case where the printer 13 is connected to a network (i.e., where the printer 13 is connected indirectly to the computer 12 and not by use of a direct cable connection) or where a port is not automatically set, the second instruction dialogue box instructs the user to click the "CANCEL" button.

Next will be described the reason why the second instruction dialogue box is displayed after the first instruction dialogue box has been displayed temporarily.

It is desired that a program can be aborted (canceled) when erroneously executed. However, a common setup program performs processing by means of the user clicking a button in a dialogue box. If a dialogue box having a "CANCEL" button (see the second instruction dialogue box in FIG. 8) is displayed from the beginning, conceivably the user may click a button in the dialogue box without understanding instructions provided in the dialogue box. For this reason, in this embodiment, the first and second instruction dialogue boxes are displayed sequentially, to thereby inform the user of operations to be performed without fail and in such a manner that the user can cancel operations.

After completion of the second instruction dialogue box display operation (step S212), processing pertaining to step S213 and subsequent steps, which has already been described, is performed. In a case where the second instruction dialogue box has already been displayed (YES is selected in step S211), processing pertaining to step S213 and subsequent steps is performed without involvement of processing pertaining to step S212.

Figure 9:
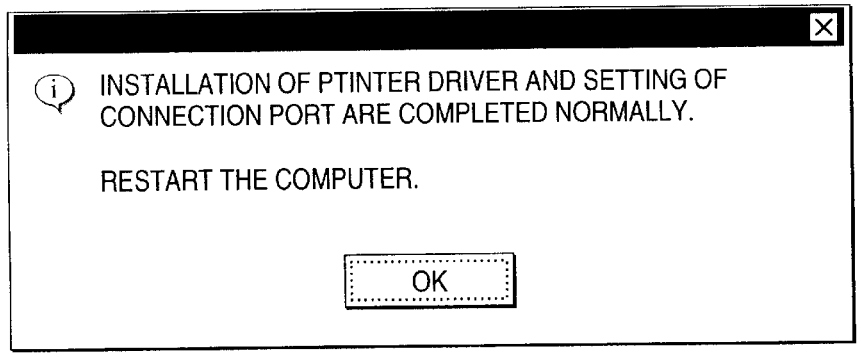
FIG. 9 is an illustration for describing a setting completion dialogue box displayed at the time of the connection monitoring operation.

In a case where a printer of interest is detected as being connected to the LPT port (YES is selected in step S206), a setting completion dialogue box appears on the display (step S207). As shown in FIG. 9, the setting completion dialogue box displayed in step S207 shows that installation of a printer driver and setting of a connection port have been completed normally. The setting completion dialogue box has an "OK" button. When the "OK" button is clicked, processing pertaining to step S207 is completed, wherewith the connection monitoring operation and the setup processing (see FIG. 3) are completed.

In a case where an EPUSB port is available (YES is selected in step S202), a determination is made as to whether or not a printer of interest is connected to the EPUSB port (step S203). As in the case of the determination as to an LPT port performed in step S206, a determination is made in step S203 by means of acquiring a vendor ID or a like ID from the device connected to the EPUSB port.

In a case where a printer of interest is not connected to the EPUSB port (NO is selected in step S203), processing pertaining to step S205 is performed. In contrast, in a case where a printer of interest is connected to the EPUSB port (YES is selected in step S203), a connection port to which the printer is to be connected is switched from the LPT port to the EPUSB port (step S204). Subsequently, a setting completion dialogue box (see FIG. 9) appears on the display (step S207). When the user clicks an "OK" button in the setting completion dialogue box, the connection monitoring operation and the setup operation are completed.

Figure 10:
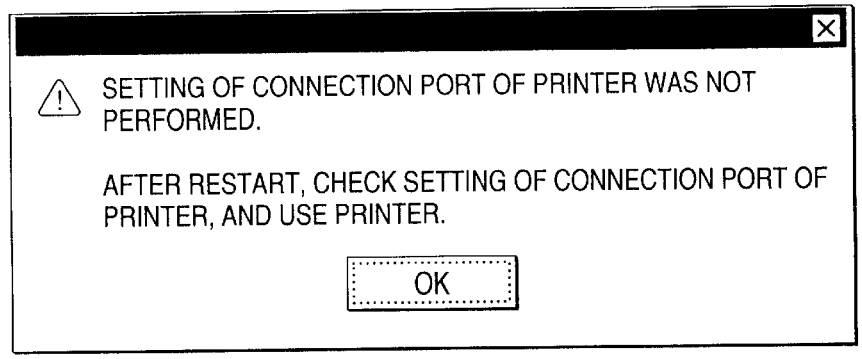
FIG. 10 is an illustration for describing a first completion dialogue box displayed at the time of the connection monitoring operation.

In a case where the user clicks a "CANCEL" button in the second instruction dialogue box (see FIG. 8) (YES is selected in step S213), the first completion dialogue box shown in FIG. 10 appears on the display (step S214). More specifically, there is displayed a first completion dialogue box having an "OK" button and indicating that setting of a connection port has not been performed. When the "OK" button on the first completion dialogue box is clicked, the connection monitoring operation and the setup operation are completed.

In a case where a predetermined period of time has lapsed since processing pertaining to step S201 has been performed and without detecting issuance of a cancel instruction or connection of a printer of interest to the computer 12 (i.e., the EPUSB port or the LPT port); that is, where a timeout has arisen (YES is selected in step S215), a determination is made as to whether or not both the EPUSB port and the LPT port are available (step S220), as shown in FIG. 5. In a case where one or both the ports is unavailable (NO is selected in step S220), if a timeout that has arisen is determined to be the first timeout (YES is selected in step S221), a first warning dialogue box appears on the display (step S223).

Figure 11:
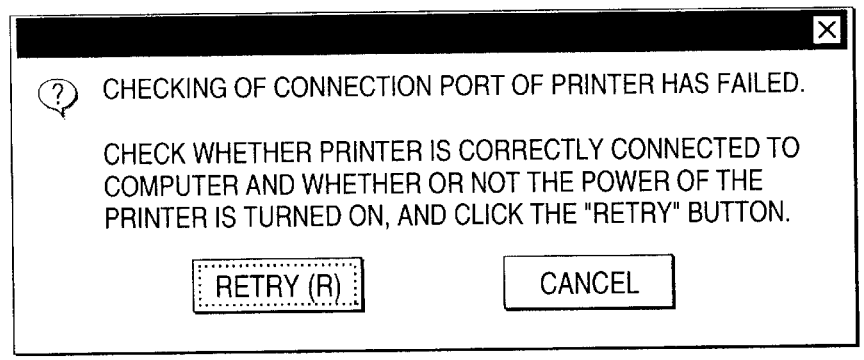
FIG. 11 is an illustration for describing a first warning dialogue box displayed at the time of the connection monitoring operation.

FIG. 11 shows the layout of a first warning dialogue box. As can be seen from the drawing, the user cannot confirm a port by way of the first warning dialogue box. Therefore, the first warning dialogue box instructs the user to connect the printer 13 to the computer 12 and to check the power of the printer 13. The first warning dialogue box has a "RETRY" button and a "CANCEL" button.

In a case where the "RETRY" button of the first warning dialogue box is clicked (YES is selected in step S224 in FIG. 5), the displayed flag for the first instruction dialogue box and the displayed flag for the second instruction dialogue box are reset (step S226). In other words, the displayed flags are brought into an OFF sate. Processing is resumed from step S202. In contrast, in a case where the "CANCEL" button in the first warning dialogue box is clicked (NO is selected in step S224), the first completion dialogue box that has already been described is displayed (step S225). When the "OK" button in the first completion dialogue box is clicked, the connection monitoring operation and the setup operation are completed.

Figure 12:
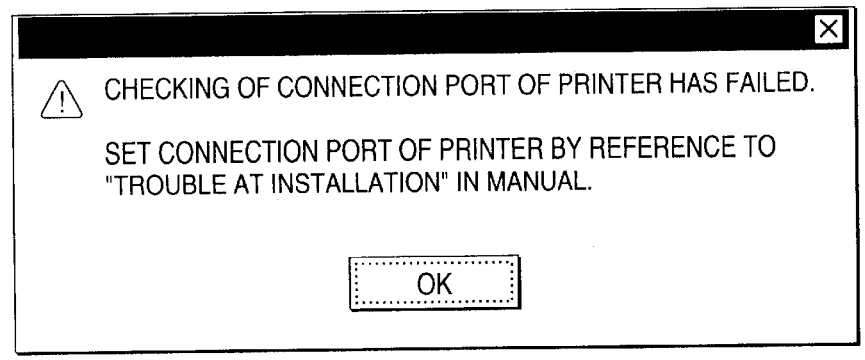
FIG. 12 is an illustration for describing a second completion dialogue box displayed at the time of the connection monitoring operation.

In a case where a timeout which has arisen when one or both of the EPUSB port and the LPT port is unavailable is not the first timeout (NO is selected in step S221), the second completion dialogue box shown in FIG. 12 appears on the display (step S222). More specifically, it is displayed that printer setup has failed by reason of trouble, and the second dialogue box having an "OK" button is displayed. When the "OK" button in the second completion dialogue box is clicked, processing pertaining to step S222 is completed, whereupon the connection monitoring operation and the setup operation are completed.

In a case where both the EPUSB port and the LPT port are available (YES is selected in step S220 in FIG. 5) when a timeout has arisen (YES is selected in step S215 in FIG. 4) and where the timeout that has arisen is the first timeout (YES is selected in step S231), the second warning dialogue box appears on the display (step S233).

Figure 13:
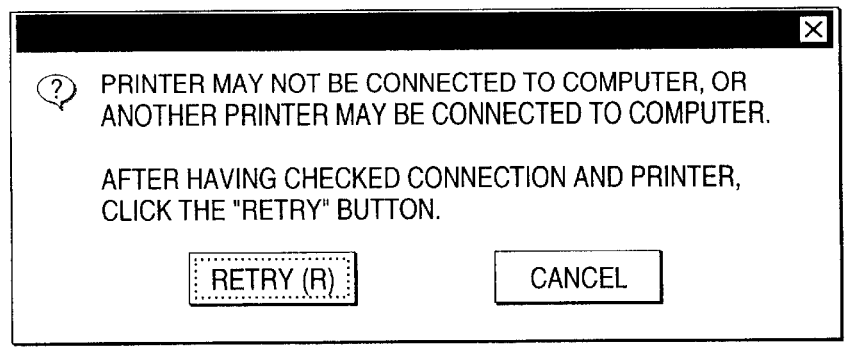
FIG. 13 is an illustration for describing a second warning dialogue box displayed at the time of the connection monitoring operation.

As shown in FIG. 13, the second warning dialogue box displayed in step S233 shows a message instructing the user to connect the printer 13 to the computer 12 and a message instructing the user to check the power of the printer 13. Further, the "RETRY" and "CANCEL" buttons are provided in the second warning dialogue box.

In a case where the "RETRY" button in the second warning dialogue box is clicked (YES is selected in step S234), displayed flags are reset in step S226. Subsequently, processing is resumed from step S202. In a case where the "CANCEL" button in the second warning dialogue box is clicked (NO is selected in step S234), the first completion dialogue box appears (step S235). When the "OK" button in the first completion dialogue box is clicked, processing pertaining to step S235 is completed. The connection monitoring operation and the setup operation are completed.

In a case where the second timeout has arisen (NO is selected in step S231) while the EPUSB port and the LPT port are available (YES is selected in step S220), a first completion dialogue box appears (step S232). When the "OK" button on the first completion dialogue box is clicked, processing pertaining to step S232 is completed. The connection monitoring operation and the setup operation are completed.

The setup operations mentioned above will be described in more detail by means of linking the setup operations with operations to be performed by the user.

Consideration is now given to a case where the user who has viewed the first instruction dialogue box (or the second instruction dialogue box) appearing on the display has connected the printer 13 to the computer 12 through use of a parallel cable and has turned on the power of the printer 13. In this case, it is detected that a printer of interest is connected to the LPT port. YES is selected in step S206. As a result, printer setup is completed without changing a connection port to which the printer is to be connected. In this case, the USB port driver file copied to the hard disk drive of the computer 12 from the setup computer-readable medium 11 is not actually used, and a setup operation is completed.

Next, consideration is given to a case where the user who has viewed the first instruction dialogue box (or the second instruction dialogue box) has connected the printer 13 to the computer 12 through use of a USB cable and turned on the power of the printer 13.

In this case, WINDOWS (more specifically, a configuration manager) detects additional connection of a new device to the computer 12, and a vendor ID and a device ID are acquired from the device. On the basis of the thus-acquired IDs, an INF file for the newly-connected device (an EPUSB port in this case) is retrieved from a folder ¥WINDOWS¥INF.

In step S103, the INF file for an EPUSB port is prepared within the folder ¥WINDOWS¥INF. A file for an EPUSB port driver is prepared in a folder which is defined as a recording location within the INF file. Therefore, an EPUSB port driver is installed in WINDOWS. Further, information indicating that an EPUSB port is available is written into a registry.

As a result, at the time of a connection monitoring operation being performed, it is detected that the EPUSB port is available and that a printer of interest is connected to the EPUSB port. YES is selected in step S203. In step S204, a connection port to which the printer is to be connected is switched to the EPUSB port. Subsequently, a setting completion dialogue box is displayed, and the connection monitoring operation and the setup operation are completed.

Consideration is now given to a case where the user who has viewed the first instruction dialogue box (or the second instruction dialogue box) has connected the printer 13 to the computer 12 through use of a parallel cable but has neglected to turn on the power of the printer 13.

In this case, a timeout is to arise when the EPUSB port is not available. Therefore, YES is selected in step S215, and NO is selected in step S220. Further, YES is selected in step S221, wherewith the first warning dialogue box (FIG. 11) appears on the display of the computer 12.

In a case where the user who has viewed the first warning dialogue box has turned on the power of the printer 13 and clicked the "RETRY" button (or has clicked the "RETRY" button and turned on the power of the printer 13), YES is selected in step S206, whose processing is to be performed next. More specifically, the setup operation is completed while the printer 13 remains connected to the LPT port. In a case where the printer connected to the LPT port is not classified as a printer of interest, YES is not selected in step S206. Hence, the second timeout arises. Consequently, a second completion dialogue box (FIG. 12) is displayed, and a setup operation is completed.

Even in a case where the user who has viewed the first instruction dialogue box (or the second instruction dialogue box) has connected the printer 13 to the computer 12 through use of a USB cable but has neglected to turn on the power of the printer 13, a timeout arises while the EPUSB port is not available. As a result, YES is selected in step S215, and NO is selected in step S220. Further, YES is selected in step S221, whereupon the first warning dialogue box appears on the display of the computer 12.

In a case where the user who has viewed the first warning dialogue box has turned on the power of the printer 13 and clicked the "RETRY" button (turned on the power of the printer 13 after having clicked the "RETRY" button), the EPUSB port driver is installed in WINDOWS, and YES is selected in steps S202 and S203, which are to be executed next. The connection port to which the printer 13 is to be connected is switched to the EPUSB port, and the setup operation is completed. In a case where the printer connected to the USB port is not classified as a printer of interest, YES is not selected in step S203. Hence, the second timeout arises. Consequently, a first completion dialogue box (step S232 in FIG. 5) is displayed, and the setup operation is completed. The dialogue box displayed in step S222 is different from the dialogue box displayed in step S232. The reason for this is that a trouble is more likely to arise in a case where processing pertaining to step S232 is performed (in this case, at least the EPUSB port is prepared) than in a case where processing pertaining to step S222 is performed.

Figure 14:
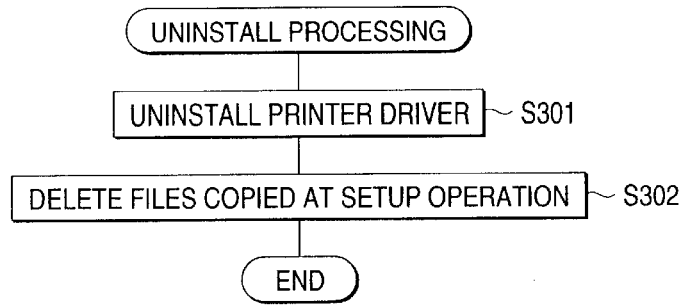
FIG. 14 is a flowchart showing an operation which is performed in accordance with an uninstall program recorded on the setup computer-readable medium according to the embodiment.
Figure 15:
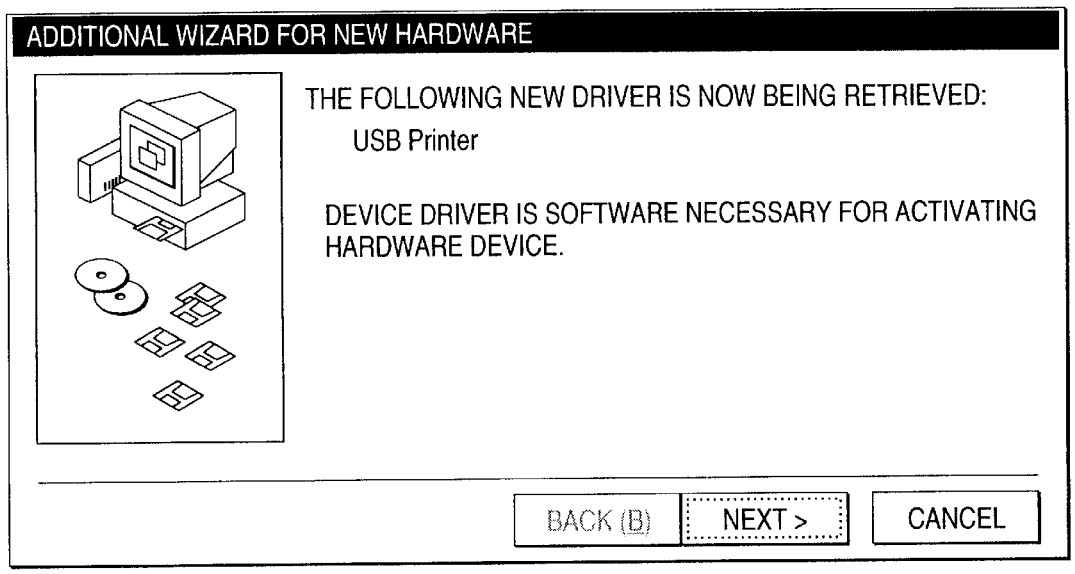
FIG. 15 is an illustration for describing a dialogue box which is displayed when a USB printer is connected to a computer.
Figure 16:
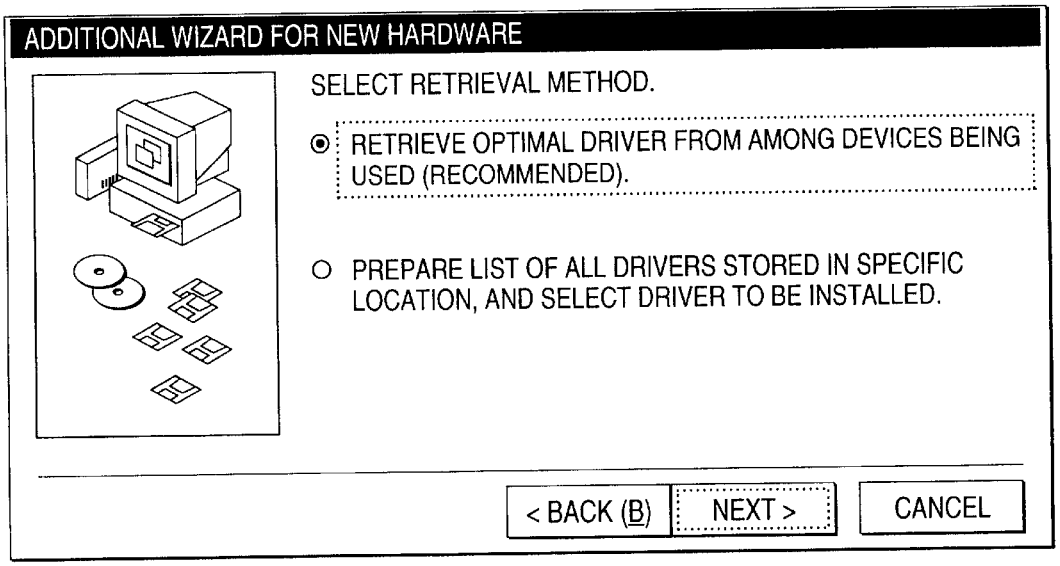
FIG. 16 is an illustration for describing a dialogue box which is displayed after display of the dialogue box shown in FIG. 15 when a USB printer is connected to a computer.
Figure 17:
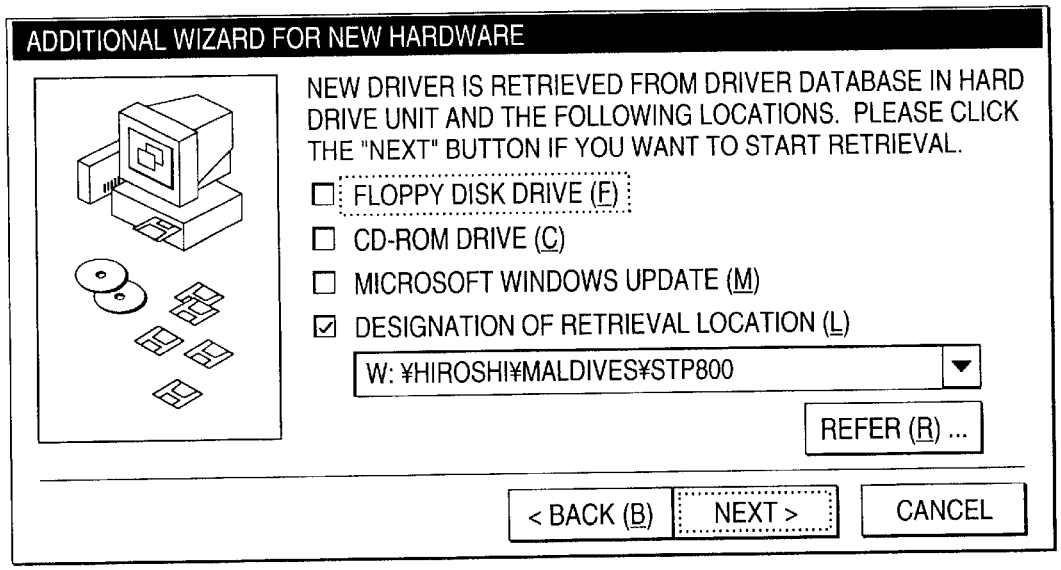
FIG. 17 is an illustration for describing a dialogue box which is displayed after display of the dialogue box shown in FIG. 16 when a USB printer is connected to a computer.
Figure 18:
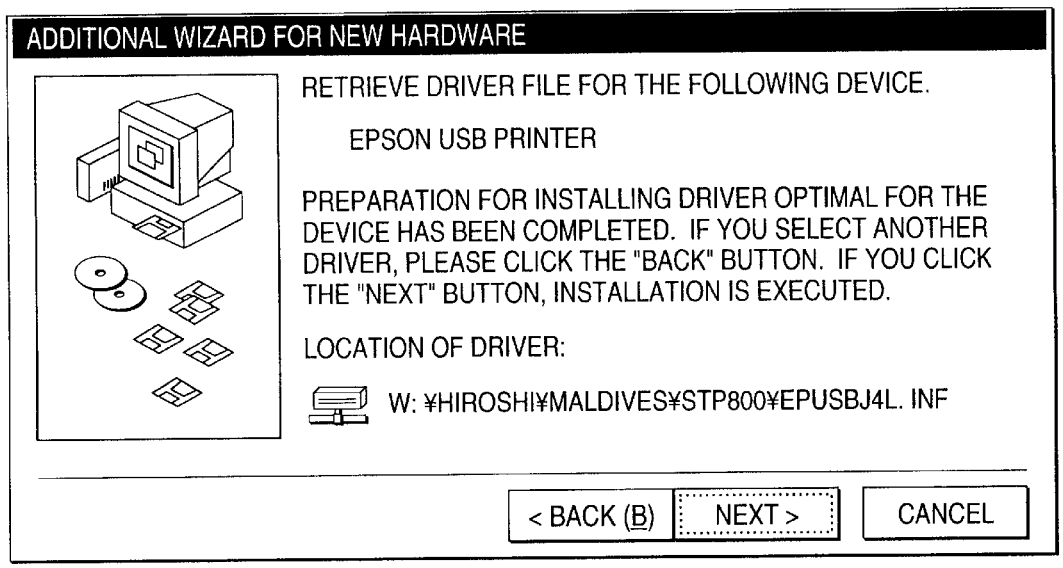
FIG. 18 is an illustration for describing a dialogue box which is displayed after display of the dialogue box shown in FIG. 17 when a USB printer is connected to a computer.
Figure 19:
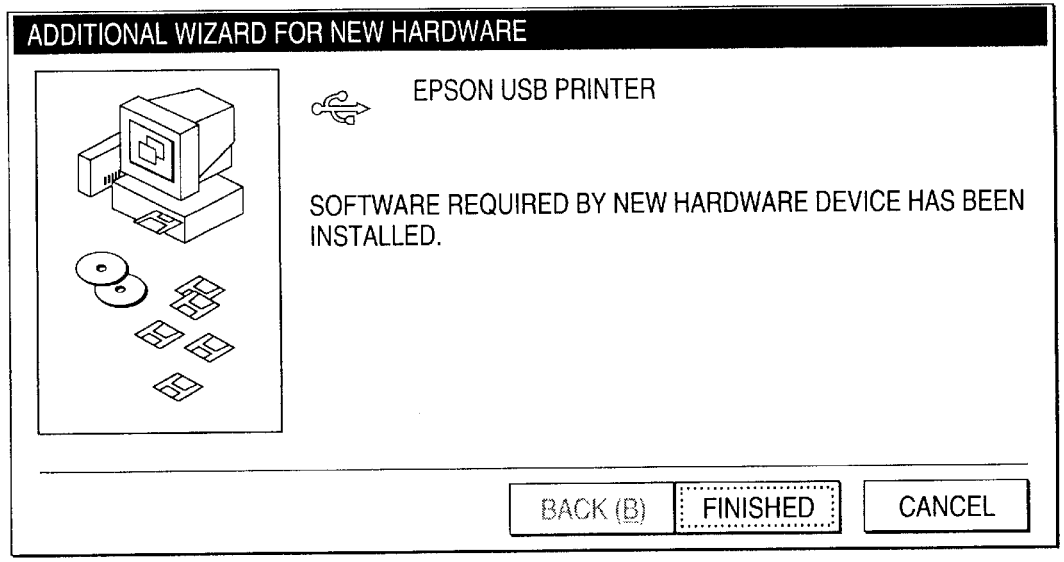
FIG. 19 is an illustration for describing a dialogue box which is displayed after display of the dialogue box shown in FIG. 18 when a USB printer is connected to a computer.
Figure 20:
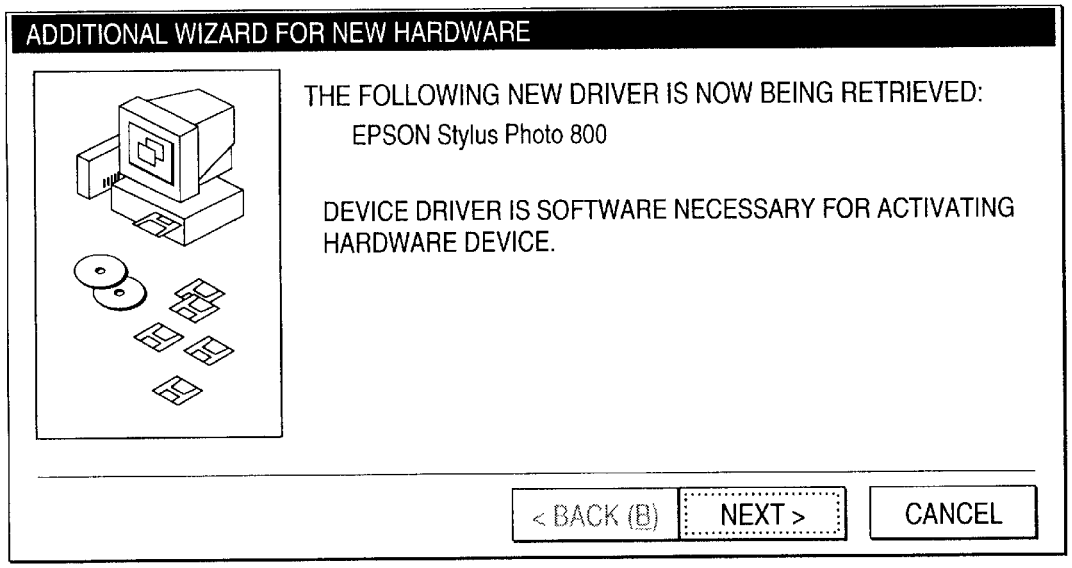
FIG. 20 is an illustration for describing a dialogue box which is displayed after display of the dialogue box shown in FIG. 19 when a USB printer is connected to a computer.
Figure 21:
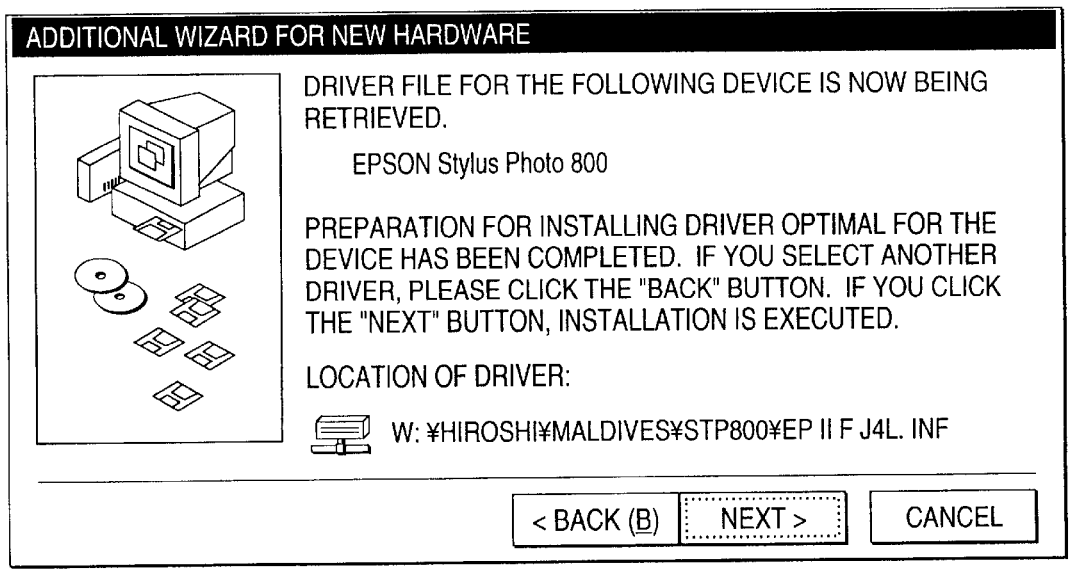
FIG. 21 is an illustration for describing a dialogue box which is displayed after display of the dialogue box shown in FIG. 20 when a USB printer is connected to a computer.
Figure 22:
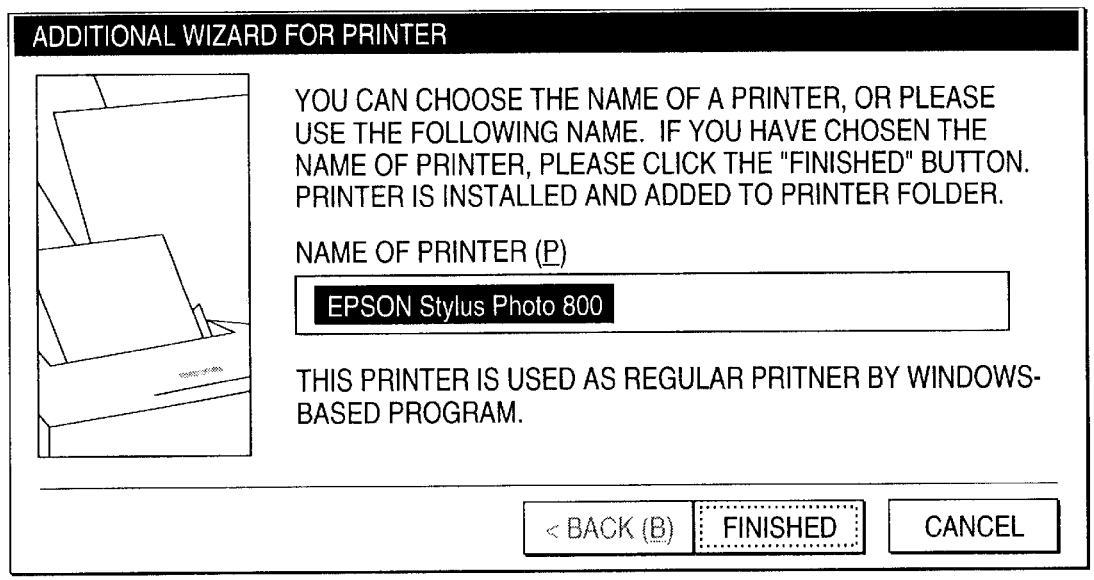
FIG. 22 is an illustration for describing a dialogue box which is displayed after display of the dialogue box shown in FIG. 21 when a USB printer is connected to a computer.
Figure 23:
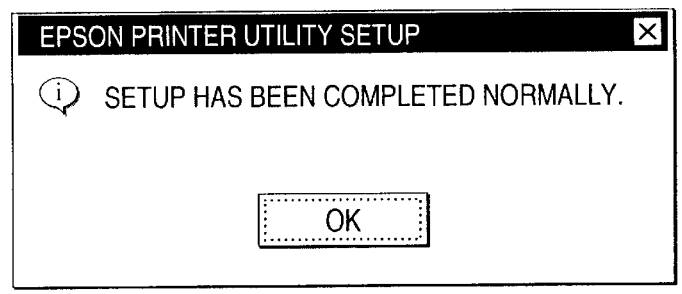
FIG. 23 is an illustration for describing a dialogue box which is displayed after display of the dialogue box shown in FIG. 22 when a USB printer is connected to a computer.
Figure 24:
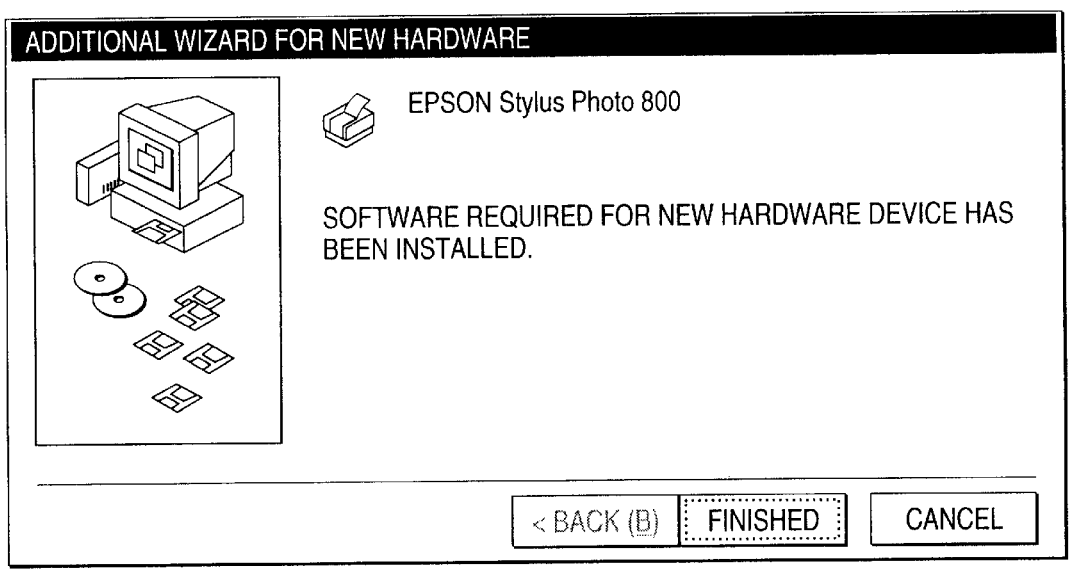
FIG. 24 is an illustration for describing a dialogue box which is displayed after display of the dialogue box shown in FIG. 23 when a USB printer is connected to a computer.

By reference to a flowchart shown in FIG. 14, an uninstall program recorded on the setup computer-readable medium 11 will now be described.

When an uninstall program is executed as illustrated, a printer driver is first uninstalled (step S301). Next, files pertaining to the EPUSB port driver which has been copied to the computer 12 in step S103 are deleted (step S302). Thus, uninstall operations are completed.

In a case where the setup computer-readable medium 11 is used, the EPUSB port driver is installed by WINDOWS rather than by a setup program. Therefore, at the time of uninstalling of the EPUSB port driver, WINDOWS (i.e., a device manager or the like device) is used. In the setup computer-readable medium 11 is recorded an uninstall program for uninstalling only the files (a printer driver, an EPUSB driver file, and an INF file) installed (copied) in the computer 12 by the setup program.

As has been described in detail, so long as the setup computer-readable medium according to this embodiment is used, printer setup is completed without involvement of indication of a dialogue box for specifying a retrieval location. Even when the user connects a printer to a computer through use of a cable of any type, the computer can utilize the printer. Accordingly, so long as the setup computer-readable medium according to this embodiment is used, even a user who cannot discriminate a parallel cable from a USB cable can set up a printer.

Modified Example

A setup computer-readable medium according to the above-described embodiment is intended for use with a printer and a computer, each having an USB interface and a parallel interface. However, the setup computer-readable medium may be modified such that it can be used with a printer and a computer, each having an IEEE 1394 interface and a parallel interface. The setup computer-readable medium can be modified by means of recording a file pertaining to IEEE 1394 on the computer readable medium in place of a file pertaining to USB. A setup program may be prepared so as to switch a connection port to which a printer is to be connected to an IEEE 1394 port when a printer of interest is acknowledged to be connected to the IEEE 1394 port.

Further, the setup computer-readable medium according to the above-described embodiment may be modified so as to be useful with a printer and a computer, each having a USB interface, an IEEE 1394 interface, and a parallel interface. Specifically, a file pertaining to IEEE 1394 is recorded on a setup computer-readable medium along with a file pertaining to USB. A setup program may be prepared so as to switch a connection port to which a printer is to be connected, to the port through which a printer is detected as being connected to a computer through use of any one of the three types of interfaces.

In a case where a printer adaptable for use with a setup computer-readable medium has the function of acting as another USB device (e.g., a PC card reader), a driver file and an INF file for the USB device may be recorded on the setup computer-readable medium. Further, a setup program can be recorded on the setup computer-readable medium for copying the driver file and the INF file to a computer.

The setup computer-readable medium is embodied as CD-ROM and may be embodied as a floppy disk. Moreover, hardware for reading a setup computer-readable medium may take the form of another computer connected to a network. In other words, a setup program may be downloaded by way of a network, and a setup operation may be performed by the thus-downloaded setup program.

According to the present invention, a driver is automatically installed in a computer by means of an operating system. Hence, virtually anybody can set up a printer without fail.

What is claimed is:

1. A setup computer-readable medium for making a printer be adaptable for use with a computer which utilizes an operating system and has an interface of first type and a parallel interface, the operating system retrieving a setup information file pertaining to an added device from a specific location and installing a driver pertaining to the device in accordance with the retrieved setup information file, the setup computer-readable medium storing:

a port driver file of first type which is a port driver file of first type for causing the interface of first type to act as a port of first type for use with the printer;

a setup information file for the port driver of first type including location designation information about a location in which the port driver file of first type is recorded;

a printer driver file for the printer; and a setup program for causing the computer to perform:

processing pertaining to a printer driver installation step of installing a printer driver for the printer in accordance with the printer driver file, on the assumption that the printer is connected to a parallel port, and processing pertaining to a copy step of copying the setup information file to the specific location and copying the port driver file of first type to a location designated by the location designation information stored in the setup information file.

2. The setup computer-readable medium as defined in claim 1, wherein the setup program causes the computer to perform processing pertaining to a connection monitoring step, in which an operating system forms a port of first type for the printer by reference to the setup information file copied to the specific location; there is monitored whether the printer is connected to the port of first type or the parallel port; when the printer is connected to the port of first type, a connection port to which the printer is to be connected is changed to the port of first type, and processing is terminated; and, when the printer is connected to the parallel port, processing is terminated without changing a connection port to which the printer is to be connected.

3. The setup computer-readable medium as defined in claim 2, wherein, in the connection monitoring step, there is displayed a first dialogue box which instructs the user to connect the printer to the computer and turn on the power of the printer and which does not have any item operable by the user; and, when a predetermined period of time has lapsed with the printer being connected to neither the parallel port nor the port of first type, there is displayed a second dialogue box having an item operable for the user, and processing is terminated when the item in the second dialogue box is operated.

4. The setup computer-readable medium as defined in claim 2, further storing an uninstall program for causing the computer to uninstall the printer driver installed in the printer driver installation step, as well as the port driver file of first type and the setup information file which have been copied in the copy step.

5. The setup computer-readable medium as defined in claim 1, wherein the interface of first type is a USB interface.

6. The setup computer-readable medium as defined in claim 2, wherein the interface of first type is a USB interface.

7. The setup computer-readable medium as defined in claim 3, wherein the interface of first type is a USB interface.

8. A setup method for making a printer be adaptable for use with a computer which utilizes an operating system and has an interface of first type and a parallel interface, the operating system retrieving a setup information file pertaining to an added device from a specific location and installing a driver pertaining to the device in accordance with the retrieved setup information file, the setup method comprising:

a printer driver installation step of installing a printer driver for the printer, on the assumption that the printer is connected to a parallel port;

a copy step of copying a setup information file to a specific location, the setup information file being a port driver file of first type for causing the interface of first type to act as a port of first type for use with the printer and including location designation information about a location in which the port driver file of first type is recorded, as well as copying the port driver file of first type to a location designated by the location designation information stored in the setup information file; and a connection step for connecting the printer to the computer after processing pertaining to the printer driver installation step and processing pertaining to the copy step have been completed.

* * * * *